(12) United States Patent
Makley et al.

(10) Patent No.: US 7,768,781 B2
(45) Date of Patent: Aug. 3, 2010

(54) COMPUTER WITH IMPROVED COOLING FEATURES

(75) Inventors: Albert Vincent Makley, Raleigh, NC (US); William Fred Martin-Otto, Apex, NC (US); Jon W. Heim, Durham, NC (US)

(73) Assignee: Lenovo Singapore Pte. Ltd, Singapore (SG)

( * ) Notice: Subject to any disclaimer, the term of this patent is extended or adjusted under 35 U.S.C. 154(b) by 97 days.

(21) Appl. No.: 11/958,648

(22) Filed: Dec. 18, 2007

(65) Prior Publication Data
US 2009/0151894 A1 Jun. 18, 2009

(51) Int. Cl.
*H05K 7/20* (2006.01)

(52) U.S. Cl. .................. 361/695; 361/690; 361/694; 174/16.1; 174/16.3; 165/80.3; 165/104.33; 454/184

(58) Field of Classification Search ................. None
See application file for complete search history.

(56) References Cited

U.S. PATENT DOCUMENTS

| | | | | |
|---|---|---|---|---|
| 5,218,514 A | * | 6/1993 | Huynh et al. | 361/679.47 |
| 5,297,005 A | * | 3/1994 | Gourdine | 361/697 |
| 6,462,948 B1 | * | 10/2002 | Leija et al. | 361/697 |
| 6,678,157 B1 | * | 1/2004 | Bestwick | 361/695 |
| 6,927,980 B2 | * | 8/2005 | Fukuda et al. | 361/700 |
| 7,061,761 B2 | * | 6/2006 | Tucker et al. | 361/695 |
| 7,111,667 B2 | * | 9/2006 | Chang | 165/80.3 |
| 7,310,228 B2 | * | 12/2007 | Chen | 361/695 |
| 7,342,786 B2 | * | 3/2008 | Malone et al. | 361/695 |
| 7,382,613 B2 | * | 6/2008 | Vinson et al. | 361/679.48 |
| 7,403,385 B2 | * | 7/2008 | Boone et al. | 361/692 |
| 7,403,388 B2 | * | 7/2008 | Chang | 361/695 |
| 7,447,021 B2 | * | 11/2008 | Chen | 361/695 |

* cited by examiner

*Primary Examiner*—Boris L Chervinsky
(74) *Attorney, Agent, or Firm*—Rogitz & Associate; Carlos Munoz-Bustamante

(57) ABSTRACT

A personal computer has a central air plenum straddled by opposed drive bays, and memory modules in the plenum are covered by a shroud that increases the air flow over the memory modules. The plenum establishes a first pathway for air flow and parallel to the plenum is a second pathway for air flow past cards such as graphics and network cards.

15 Claims, 2 Drawing Sheets

COMPUTER WITH IMPROVED COOLING FEATURES

I. FIELD OF THE INVENTION

The present invention relates generally to computers with improved cooling features, and more particularly with computers having dual air flow passageways, a duct to increase air flow over memory modules, and a central plenum straddled by opposed drive bays.

II. BACKGROUND OF THE INVENTION

Fans are used to cool the internal components of personal computers, and as ever more capable components such as multiple processors, high capacity memory modules, and sophisticated graphics cards are added, the heat removal requirements pose challenges. As understood herein, from both an energy and noise standpoint it is desirable to provide adequate cooling even for high capability personal computers without unduly multiplying the number of cooling fans used.

SUMMARY OF THE INVENTION

A personal computer includes a central air plenum straddled by opposed first and second drive bays, and at least one memory module disposed in the plenum. A shroud covers the memory module and is configured to establish an air flow over the memory module that is greater than what the air flow over the memory module otherwise would be without the shroud.

In some embodiments the plenum establishes a first pathway for air flow and parallel to the plenum a second pathway for air flow is established. One or more computer cards such as a graphics card are disposed in the second pathway.

The first drive bay may hold one or more hard disk drives and the second drive bay may hold one or more optical drives. Also, first and second central processing unit (CPU) assemblies can be disposed side by side in the plenum, with each CPU assembly having a respective CPU fan. Both of the assemblies may include a respective CPU or only a single CPU assembly may include a CPU, with the other assembly not having a CPU but only a fan.

In another aspect, a personal computer has a central air plenum straddled by opposed first and second drive bays. The plenum establishes a first pathway for air flow and parallel to the plenum a second pathway for air flow is established. A computer card is disposed in the second pathway.

In still another aspect, a method for making first and second computers includes, in each computer, establishing a respective plenum defined at least in part by opposed drive bays, with each plenum defining a respective first air flow passageway. The method includes disposing first and second CPU assemblies in the air flow passageway of the first computer, with each CPU assembly being associated with a respective CPU fan, and disposing in the plenum of the second computer a first CPU assembly having a CPU and a CPU fan and a second CPU assembly having a CPU fan but no associated CPU.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
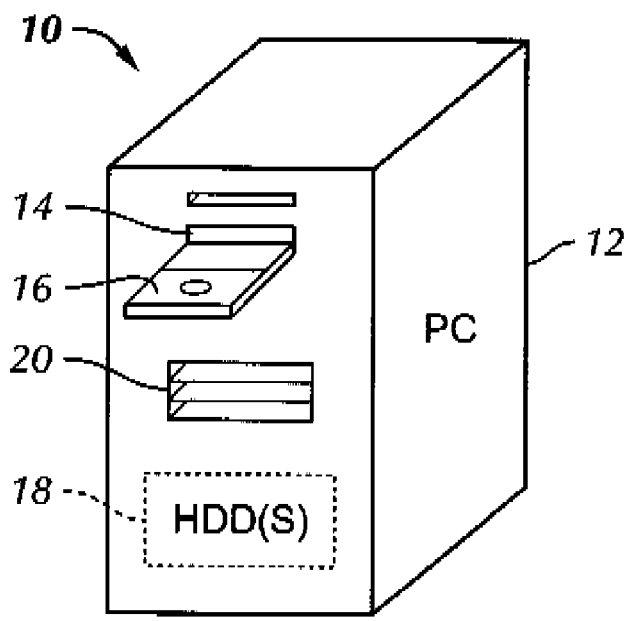
FIG. 1 is a perspective view of a personal computer in accordance with present principles, showing one optical drive with disk plate extended and showing the HDD in phantom.

Referring initially to FIG. 1, a computer 10 that in one intended-implementation is embodied as a personal computer (PC) is shown with an outer hollow parallelepiped-shaped case 12, typically made of rigid hard plastic or aluminum. The case 12 holds one or more optical drives 14 (two drives 14 shown), with each optical drive typically including an extendable and retractable disk plate 16 for receiving an optical disk thereon. Thus, in the embodiment shown the optical drives 14 are located near the top of the case 12 when the case 12 is oriented upright as intended to receive optical disks in an optical disk drive, it being understood that the computer may alternatively be oriented on its side in, e.g., a rack.

Below the optical disk drives 14 maybe one or more hard disk drives (HDD) 18, and as shown the HDD 18 and optical disk drives 14 straddle a central air plenum inlet 20, which may be covered by a grating. It is to be understood that locations of the HDD 18 and optical drives 14 can be reversed, i.e., that the optical drives 14 may be located below the inlet 20 and the HDD 18 above it.

Figure 2:
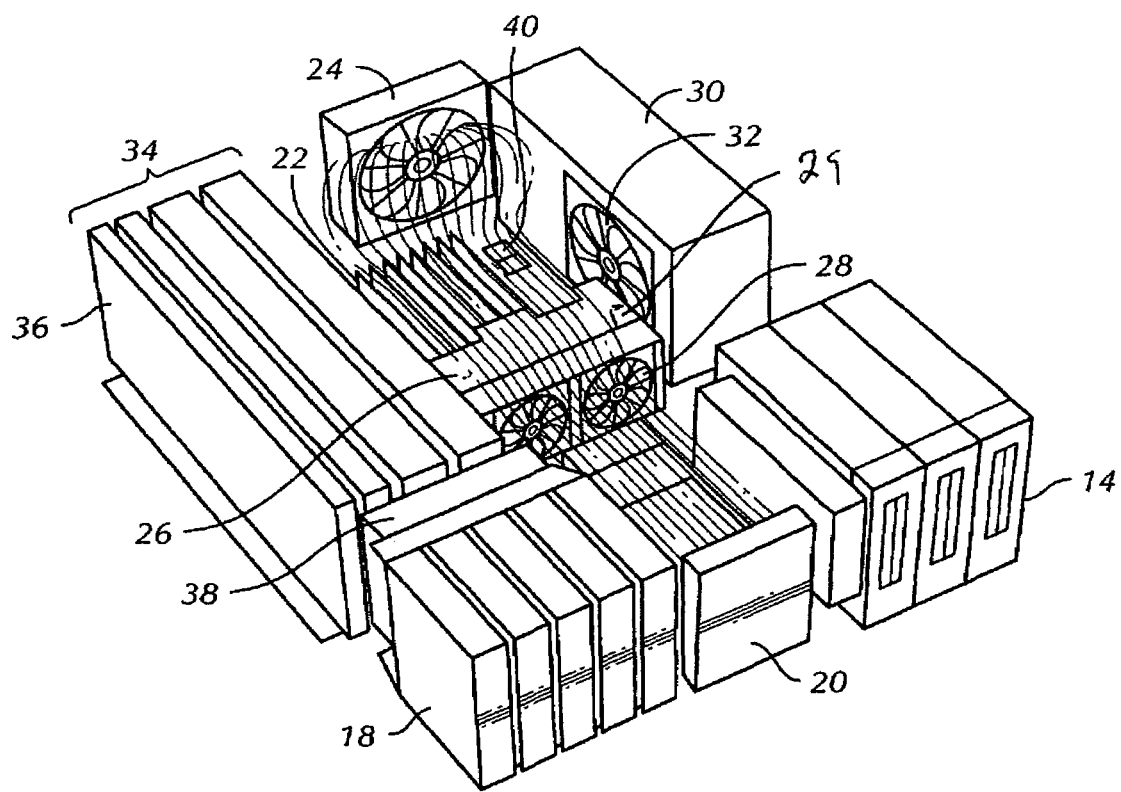
FIG. 2 is an exploded perspective view of the PC shown in FIG. 1, omitting the outer case and omitting the memory module shroud for clarity.

With the above orientation in mind, attention is now directed to FIG. 2, which shows that a central air plenum 22 extends from the inlet 20 substantially to the rear of the PC 10 between the optical drives 14 and HDD 18, terminating in a central plenum fan 24 that draws air into the inlet 20 and exhausts the air out of the rear of the PC 10. Within the central plenum 22 and generally midway between the inlet 20 and fan 24 are two side-by-side central processing unit (CPU) assemblies 26 as shown, with each CPU assembly 26 including a respective CPU fan 28. The CPU fans 28 act in concert with the central plenum fan 24 to draw air from the inlet 20. One and in some models both CPU assemblies 26 include a respective computer CPU 29 (shown schematically in FIG. 2); in other models, only one assembly 26 contains a CPU, with the other assembly being in essence a dummy assembly that holds only a CPU fan, but no CPU.

FIG. 2 also shows that behind the optical drives 14 near the top of the PC 10, a power supply 30 may be disposed. The power supply 30 typically incorporates its own power supply fan 32, although some power supplies can have bottom facing fans, some can have front facing fans, and others might not have any internal fan at all.

Similarly, behind the HDD 18 near the bottom of the PC 10, a typically plastic frame-like hollow card enclosure 34 may be disposed. The card enclosure 34 may hold one or more add-on computer cards 36 such as graphics cards, network cards, etc. and may incorporate its own card fan (not shown). In addition, an auxiliary card fan 38 may be disposed between the HDD 18 and card enclosure 34 as shown to draw air from the HDD and exhaust the air through the hollow frame-like card enclosure 34. It may now be appreciated that the central air plenum 22 establishes a first pathway for air flow and parallel to the plenum a second pathway for air flow is established from the HDD 18 through the card enclosure 34.

Figure 3:
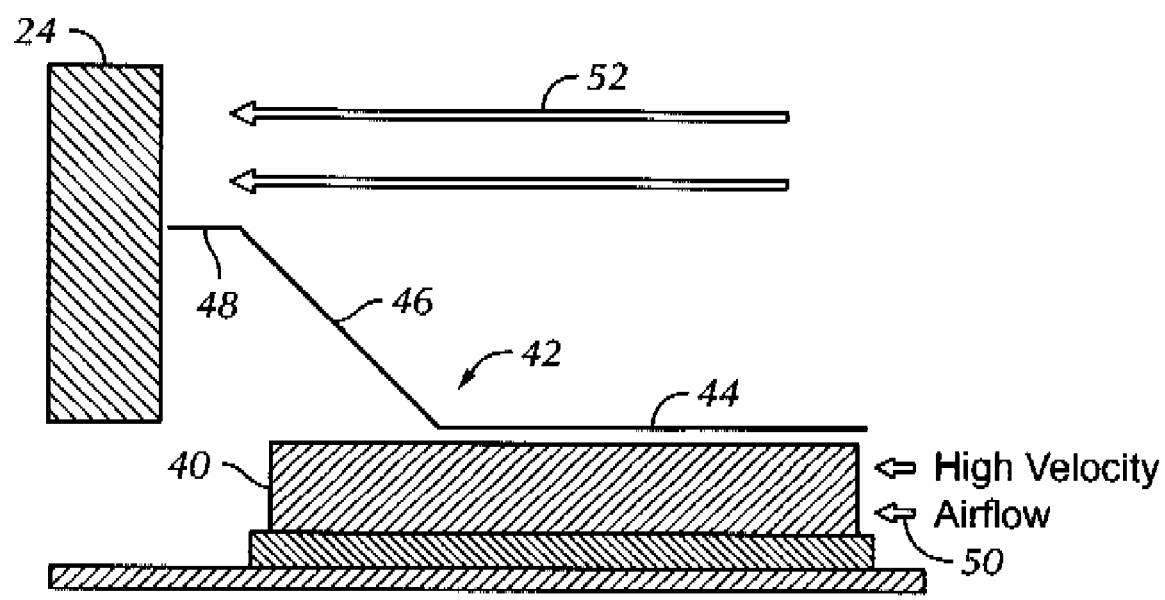
FIG. 3 is a side view of the memory modules with duct plate, illustrating how the duct plate increases air flow past the memory modules.

In cross-reference to FIGS. 2 and 3, one or more memory modules 40 such as but not limited to dual in-line memory modules (DIMM) may be disposed in the central air plenum 22 between the CPU assemblies 26 and the central plenum fan 24. FIG. 3 shows that a shroud 42 covers the memory modules 40, and the shroud 42 is configured to establish an air flow over the memory modules 40 that is greater than what the air flow would be without the shroud 42.

In the specific embodiment shown, the shroud 42 is essentially a duct plate that has a front flat surface 44 closely spaced from the memory modules 40 and oriented substantially horizontally when the PC 10 is oriented upright as shown. The first flat surface 44 terminates at its rear edge as shown in an upwardly-ramping surface 46, which in turn terminates at its rear edge in a rear horizontal surface 48 that is closely juxtaposed with about the vertical center of the central plenum fan 24 as shown. With this configuration, it will be appreciated that about one-half of the air moving capability of the fan 24 is used to move a relatively large amount of air, represented by the arrows 50 in FIG. 3, through the relatively small space between the front flat surface 44 of the shroud 42 and the memory modules 40. As shown by the arrows 52, air flow is also established above the shroud 42 by the fan 24 to cool components above the shroud.

While the particular COMPUTER WITH IMPROVED COOLING FEATURES is herein shown and described in detail, it is to be understood that the subject matter which is encompassed by the present invention is limited only by the claims.

What is claimed is:

1. A personal computer comprising:
a central air plenum straddled by opposed first and second drive bays;
at least one memory module disposed in the plenum; and
a shroud covering the memory module and configured to establish an air flow over the memory module that is greater than an air flow over the memory module otherwise would be without the shroud; the shroud including a front flat surface closely spaced from the memory module and oriented substantially horizontally when the computer is oriented upright, the first flat surface terminating at a rear edge thereof in an upwardly-ramping surface, the upwardly-ramping surface in turn terminating at a rear edge thereof in a rear horizontal surface that is closely juxtaposed with a middle of a central plenum fan so that the fan moves air below the front flat surface of the shroud over the memory module and also moves air above the shroud to cool components above the shroud.

2. The computer of claim 1 wherein the plenum establishes a first pathway for air flow and parallel to the plenum a second pathway for air flow is established, at least one computer card being disposed in the second pathway.

3. The computer of claim 1, comprising a graphic card in the second pathway.

4. The computer of claim 1, wherein the first drive bay holds at least one hard disk drive and the second drive bay holds at least one optical drive.

5. The computer of claim 1, comprising first and second central processing units (CPU) assemblies disposed side by side in the plenum, each CPU assembly having a respective CPU and respective CPU fan.

6. The computer of claim 1, comprising first and second central processing units (CPU) assemblies disposed side by side in the plenum, the first CPU assembly having a respective CPU and respective CPU fan, the second CPU assembly having a CPU fan but no CPU.

7. A personal computer comprising:
a central air plenum straddled by opposed first and second drive bays, wherein the plenum establishes a first pathway for air flow and parallel to the plenum a second pathway for air flow is established;
at least one computer card disposed in the second pathway; and
first and second central processing units (CPU) assemblies disposed side by side in the plenum, each CPU assembly having a respective CPU and respective CPU fan.

8. The computer of claim 7, comprising a graphic card in the second pathway.

9. The computer of claim 7, wherein the first drive bay holds at least one hard disk drive and the second drive bay holds at least one optical drive.

10. The computer of claim 7, comprising:
at least one memory module disposed in the plenum; and
a shroud covering the memory module and configured to establish an air flow over the memory module that is greater than an air flow over the memory module otherwise would be without the shroud.

11. A method for making first and second computer, comprising:
in each the computer, establishing a respective plenum defined at least in part by opposed drive bays and each plenum defining a respective first air flow passageway;
disposing first and second CPUs in the air flow passageway of the first computer, each CPU being associated with a respective CPU fan; and
disposing in the plenum of the second computer a first CPU assembly having a CPU and a CPU fan and a second CPU assembly having a CPU fan but no associated CPU.

12. The method of claim 11, comprising:
disposing at least one respective memory module in the respective plenum of each respective computer; and
using a respective shroud to cover each respective memory module to establish an air flow over the memory module that is greater than an air flow over the memory module otherwise would be without the shroud.

13. The method of claim 11, wherein in each computer parallel to the respective plenum a respective second pathway for air flow is established, at least one respective computer card being disposed in the respective second pathway.

14. The method of claim 13, comprising disposing a respective graphic card in the respective second pathway.

15. The method of claim 11, wherein a first drive bay in the first computer holds at least one hard disk drive and a second drive bay in the first computer holds at least one optical drive.

* * * * *